(12) United States Patent
Graham

(10) Patent No.: US 6,381,963 B1
(45) Date of Patent: May 7, 2002

(54) HIGH TEMPERATURE INTERMITTENTLY SEALABLE REFRACTORY TILE AND CONTROLLED AIR CONTINUOUS GASIFIERS MANUFACTURED THEREWITH

(75) Inventor: Robert G. Graham, Presque Isle, MI (US)

(73) Assignee: Ethopower Corporation Inc., Kelowa (CA)

( * ) Notice: Subject to any disclaimer, the term of this patent is extended or adjusted under 35 U.S.C. 154(b) by 0 days.

(21) Appl. No.: 09/705,078

(22) Filed: Nov. 2, 2000

(51) Int. Cl.[7] ............................................. F01K 13/00

(52) U.S. Cl. ........................................ 60/645; 60/670
(58) Field of Search .................. 60/645, 670; 122/7 R, 122/235.11

(56) References Cited

U.S. PATENT DOCUMENTS

| | | | | |
|---|---|---|---|---|
| 4,898,122 A | * | 2/1990 | Black | 122/6 A |
| 5,154,605 A | * | 10/1992 | Suey | 432/234 |
| 5,243,801 A | * | 9/1993 | Aiken et al. | 52/474 |
| 5,558,045 A | * | 9/1996 | Cole et al. | 122/6 A |
| 5,673,527 A | * | 10/1997 | Boston et al. | 52/506.02 |
| 6,179,610 B1 | * | 1/2001 | Suey et al. | 432/233 |

* cited by examiner

Primary Examiner—Hoang Nguyen
(74) Attorney, Agent, or Firm—Robert L. McKellar

(57) ABSTRACT

High temperature intermittently sealable refractory tile and controlled air continuous gasifiers (rotary kilns) that are manufactured using such refractory tile, waste to energy systems that have such gasifiers as part of the system, and processes in which such waste to energy systems are used, for example, co-generation steam and power plants using biomass as the fuel for the process.

50 Claims, 11 Drawing Sheets

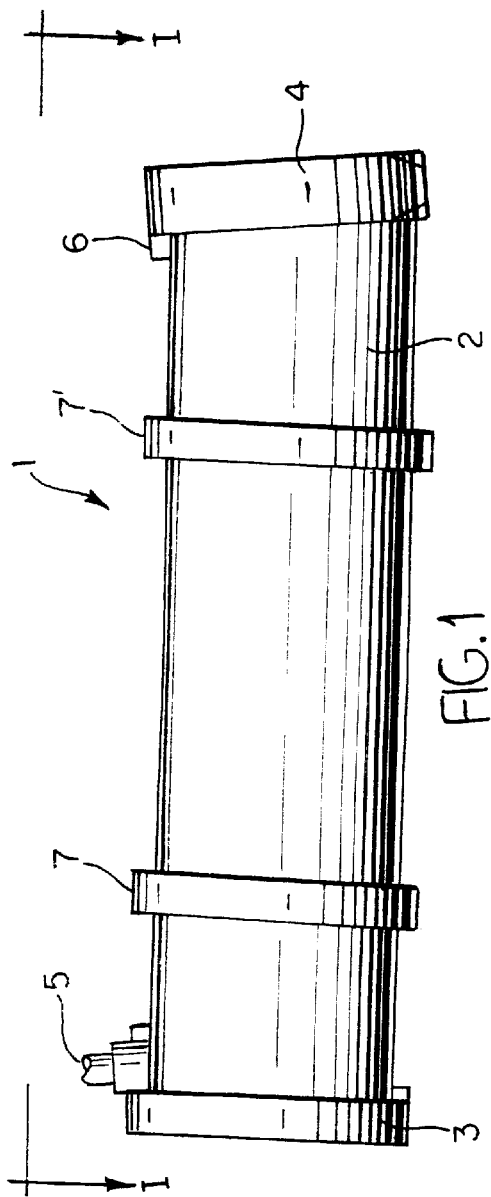
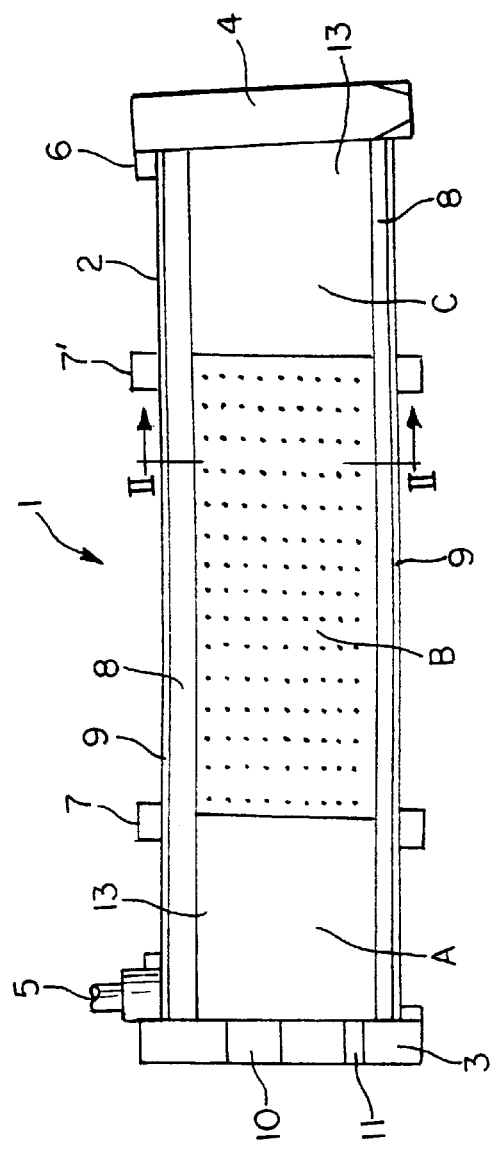

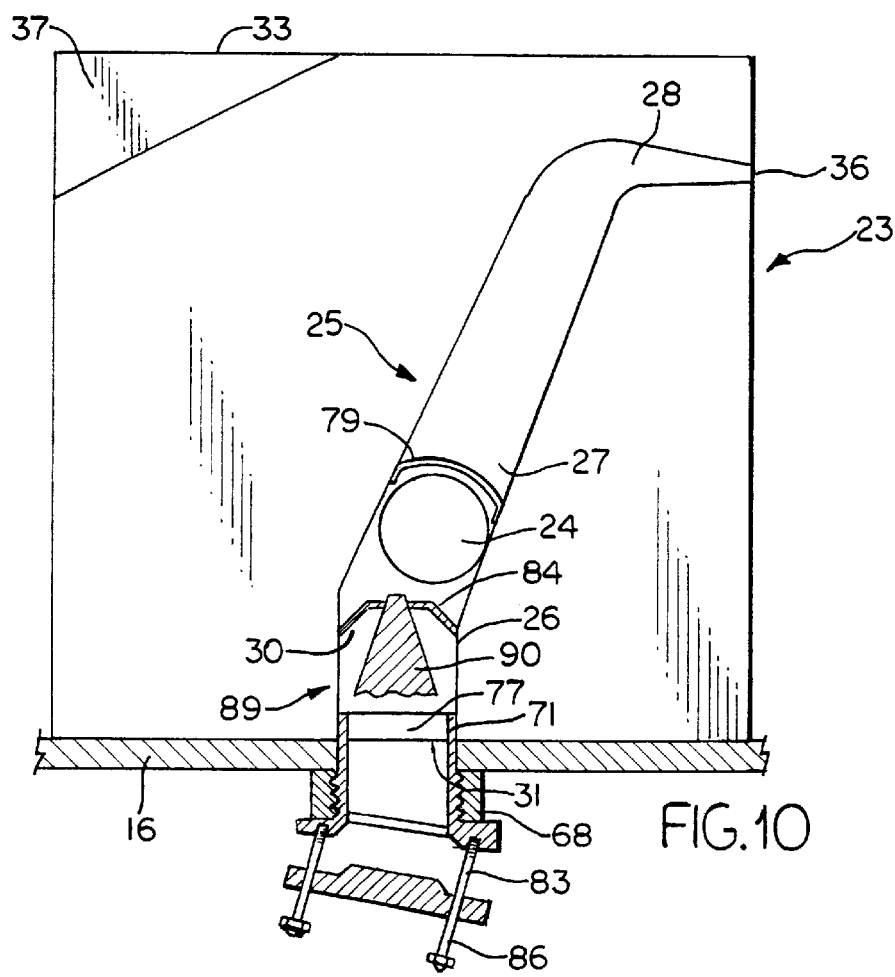
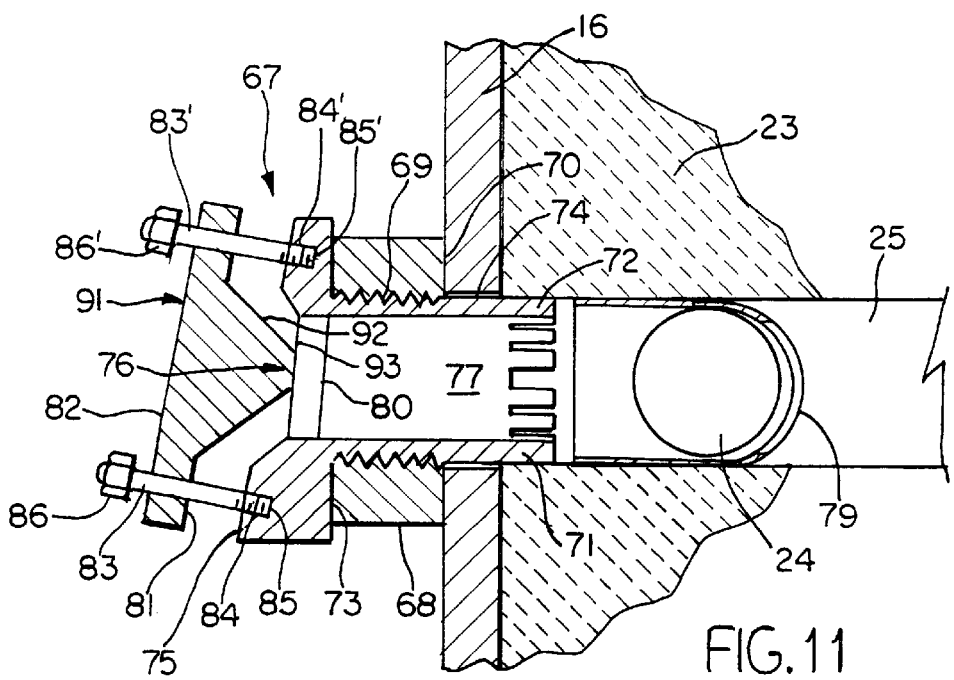

HIGH TEMPERATURE INTERMITTENTLY SEALABLE REFRACTORY TILE AND CONTROLLED AIR CONTINUOUS GASIFIERS MANUFACTURED THEREWITH

The invention disclosed and claimed herein deals with high temperature ceramic intermittently sealable refractory tile and controlled air continuous gasifiers (rotary kilns) that are manufactured using such refractory tile, and waste to energy systems that have such gasifiers as part of the system.

The refractory tile and the novel controlled air continuous gasifiers of this invention form part of a system that is novel and environmentally effective to directly convert the latent thermal energy of biomass waste to power (electricity or steam) without the need for costly processes to clean contaminated flue gases.

BACKGROUND OF THE INVENTION

A rotary kiln is essentially a slow moving, i.e. rotating, refractory-lined steel cylinder. To facilitate the movement of waste material, it generally slants downward from the feed end to the outlet end. The kiln is heated to high temperatures and as material passes through the kiln, waste is evaporated, organic materials are volatized and combustion begins. Generally, rotary kilns can be designed to operate at temperatures between 1400 and 2600 degrees Fahrenheit. The kiln's end product can be either ash or slag, depending on the mode of operation and the initial characteristics of the waste that is fed to the kiln.

Key elements of rotary kiln design are the end seals, drive assembly, kiln refractory and control systems. The end seals are designed to minimize leakage of air into the system and prevent escape of combustion gases. The drive assembly must supply enough torque to rotate the kiln under all operating conditions. The refractory lining (tile) protects the kiln shell from overheating and chemical attack. At the same time, it provides a hot surface to aid in ignition and combustion of waste. Refractory surfaces near the feed inlet are designed for resistance to high impact and thermal shock loads. In the discharge area, refractory must withstand chemical attack and slag penetration.

In the inventive system disclosed and claimed herein using a rotary kiln of this invention, contaminated flue gas from waste combustion is used to heat clean air indirectly in a ceramic heat exchanger to temperatures up to about 2000 degrees Fahrenheit and clean air side pressures up to about 200 psig to run a gas turbine. No flue gas treatment is required, and the gas turbine can discharge clean air for process use rather than combustion products. The novel refractory tiles of this invention allow for the processing of waste without slag buildup and thus this invention eliminates one of the major problems associated with prior art kilns.

The invention herein destroys biomass and related wastes at their source and produces electrical power more efficiently than can be accomplished with conventional steam power plants. The system has low leakage in the heat exchangers used therein, and turbine efficiencies are high owing to the use of controlled maintenance air instead of combustion products.

Plants using the systems disclosed herein can be sized to handle large volume, low heat release, wet materials, at the source, to reduce trucking, storage, and related material handling situations. This process makes it possible for remote communities and industries to destroy municipal solid waste, sludge, wood products and trash and at the same time, generate electricity by firing a gas turbine with clean air.

THE INVENTION

The invention claimed herein deals with high temperature ceramic intermittently sealable refractory tile and controlled air continuous gasifiers that are manufactured using such refractory tile, and waste to energy systems that have such gasifiers as part of the system.

Thus, this invention deals in one embodiment with a ceramic ball seal refractory tile comprising a tile and contained within the tile is an air shaft, wherein the air shaft has contained in its interior a ceramic ball which can act as a seal for the air shaft.

This invention also deals with another embodiment which is a ceramic cap sealable refractory tile comprising a refractory tile and contained within said refractory tile, an air shaft having a near end, wherein the air shaft has a cap sealing mechanism mounted on the outside of the near end, which cap sealing mechanism acts as an intermittent seal for the air shaft.

A further embodiment of this invention is a ceramic cap sealable refractory tile comprising a refractory tile and contained within said refractory tile, an air shaft having a near end, wherein the air shaft has a cap sealing mechanism mounted on the outside of the near end, which cap sealing mechanism has associated with it a needle valve arrangement.

Yet another embodiment of this invention is a ceramic needle valve refractory tile comprising a tile and contained within the tile is an air shaft, wherein the air shaft has contained in its interior a ceramic needle valve which can act as a seal for the air shaft.

More specifically, this invention deals in one embodiment with a ceramic ball seal refractory tile comprising a ceramic refractory tile, an air shaft, a ceramic ball and, a delivery notch for air delivery, wherein the refractory tile is a high temperature ceramic refractory tile having a top, a bottom, a front and a back. The ceramic refractory tile has contained in it an air shaft which comprises an essentially vertical segment opening through the bottom of the refractory tile. The vertical segment has a bottom edge and the vertical segment has a generally cylindrical configuration. There is also present a flared, essentially horizontal segment opening through the back of the refractory tile and near the top of the refractory tile.

In addition, there is a non-vertical segment which provides a continuous conduit from the vertical segment to the horizontal segment. The non-vertical segment has a top half and a bottom half wherein the top half is flared and the bottom half is cylindrical.

The air shaft has a reduced neck at about the connecting point of the horizontal segment and the non-vertical segment to form a constriction in the air shaft which constriction provides for retaining the ceramic ball such that the ceramic ball can seat in said constriction to prevent the flow of air through the air shaft.

The delivery notch is located in the top of the refractory tile, at the front of the refractory tile. The depth of the delivery notch is deeper at the front, the depth being deeper than the exit point of the horizontal segment at the back of the refractory tile and the width of the delivery notch at the front of the refractory tile is at least as wide as the flare of the horizontal segment at the back of the refractory tile.

A variation of the sealing means described just supra is the substitution of the cap sealing mechanism mounted on the outside of the near end of the air shaft in place of the ball seal.

Such cap sealing mechanisms are used in conjunction with any of the ball or plug sealing mechanisms described herein. Such cap sealing mechanisms can be set for an angle of closure depending on several factors, for example the angle of repose of the waste inside. Such settings can be anticipated and calculated and the cap sealing mechanism preset for a given biomass.

Another variation of the sealing means described just supra is the substitution of a cap needle valve and, the needle valve in the air shaft.

It is contemplated within the scope of this invention to use other air control mechanisms to control the flow of air through the air shaft to provide the benefits set forth herein.

Another embodiment of this invention is a controlled air continuous gasifier containing a plurality of the refractory tile as described supra, it being understood that the continuous gasifier can use any of the air control mechanisms described herein, and can have a combination of such refractory tile.

More specifically, in one embodiment, the controlled air, continuous gasifier, comprises (i) a cylinder having a feed end and a product end and (ii) a feed end cap on the feed end of the cylinder. In addition, there is present, (iii) a product end cap on the product end of the cylinder and (iv) a product exit port in the product end cap. There is (v) a flue gas exit port in the feed end cap along with (vi) a waste feed port.

There is (vii), at least one air injection port near the product end cap, at least one air exit port (vii) near the feed end cap and at least one air exit port (viii) near the feed end cap in addition to a means (ix) for allowing rotation of the gasifier.

The cylinder comprises a refractory lined open center core running essentially the full length of the cylinder, wherein the refractory lining has an inside surface and an outside surface. There is a first metal shell covering the entire outside surface of the refractory lining, and the first metal shell has an outside surface as well.

There is an insulated second metal shell formed adjacent to, and conforming to, the outside surface configuration of the first metal shell such that there is a hollow core provided between the first metal shell and the second metal shell.

The refractory lining is as described supra, and is a ceramic refractory tile comprising a ceramic refractory tile, an air shaft, a ceramic ball, or ceramic needle, and, a delivery notch, wherein the refractory tile is a high temperature ceramic refractory tile having a top, a bottom, a front and a back. The ceramic refractory tile has contained in it, an air shaft, which air shaft comprises an essentially vertical segment opening through the bottom of the refractory tile. The vertical segment has a bottom and the vertical segment has a generally cylindrical configuration.

There is a flared, essentially horizontal segment opening through the back of the refractory tile and near the top of the refractory tile and a non-vertical segment providing a continuous conduit from the vertical segment to the horizontal segment.

The non-vertical segment has a top half and a bottom half wherein the top half is flared and the bottom half is cylindrical. The air shaft has a reduced neck at about the connecting point of the vertical segment and the non-vertical segment to form a constriction in the air shaft which constriction provides for retaining the ceramic ball or ceramic needle such that the ceramic ball or ceramic needle can seat in the constriction to prevent the flow of air through the air shaft.

The delivery notch is located in the top of the refractory tile, at the front of the refractory tile, the depth of said notch at the front of the refractory tile being deeper than the exit point of (ii) at the back of the refractory tile. The width of the notch at the front of the refractory tile is at least as wide as the flare of the horizontal segment at the back of the refractory tile.

There is still a further embodiment of this invention which is a waste to energy system comprising in combination at least the following: a. a gasifier of this invention; b. an oxidizer; c. an air-to-air, all-ceramic heat exchanger; d. a gas turbine; e. a generator operating from the gas turbine; f. a filter and compressor driven by the gas turbine.

It is further contemplated within the scope of this invention to add other elements to the system, depending on the location of the plant, the type of waste being processed, the availability of auxiliary fuel, and other such factors. For example, there can be added a high pressure, medium temperature, alloy metal air-to-air heat exchanger to the combination set forth just above. Other equipment is that equipment which is standard in the industry and can be, for example, waste feeders, shredders, and grinders; ash collectors and conveyors, other secondary combustion chambers; particle removers and filters; evaporators; acid scrubbers; boilers and economizers; steam generation and handling equipment; fans; stacks and chimneys; air handling equipment; means and methods of rotating the gasifier, and, means and methods of controlling all of such equipment.

It is contemplated within the scope of this invention to use auxiliary fuel supplies for firing the gasifier, firing the secondary combustion chambers, other equipment requiring such additional fueling, or any combination of them in the system.

BRIEF DESCRIPTION OF THE DRAWINGS

FIG. 1 is a full side view of a gasifier of this invention.

FIG. 2 is a cross sectional view of FIG. 1, taken through the line I—I of FIG. 1.

FIG. 10 is a view of one half of a tile of this invention similar to FIG. 4, in which the ball valve has been substituted by a needle valve wherein the needle and the needle seat are shown in cross section.

FIG. 11 is a cross sectional view of a tile of this invention similar to FIG. 9, in which the ball valve has been substituted by a cap needle valve.

DETAILED DESCRIPTION OF THE DRAWINGS

Figure 3:
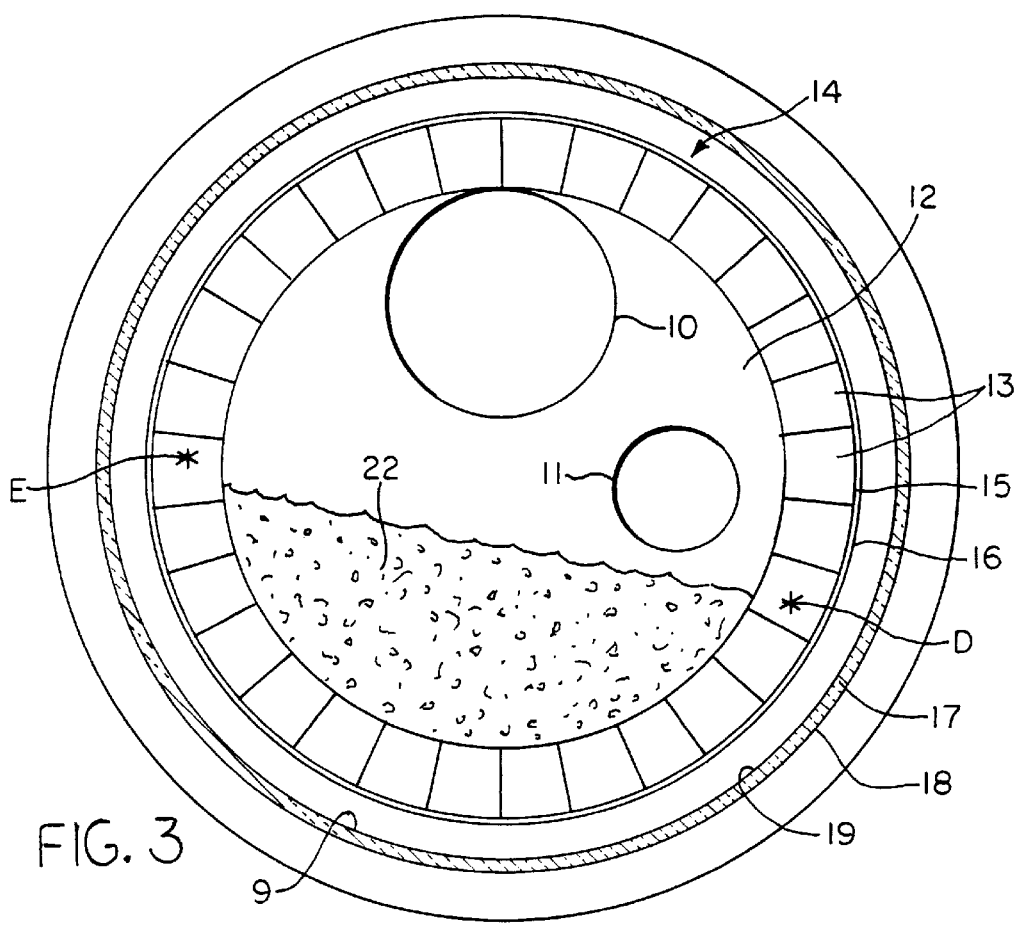
FIG. 3 is an elevation of the feed end of a gasifier of this invention.

Turning now to the Figures, there is shown in FIG. 1, a full side view of a gasifier 1 of this invention. There is shown a cylindrical element 2, which is generally an insulated metal shell. Also shown are the feed end cap 3 and the product end cap 4, along with an air exit port 5, and an air inlet port 6. Shown at the center of the cylindrical element 2 are the rotating means 7 and 7'.

With reference to FIG. 2, there is shown a cross sectional view of the gasifier 1 of FIG. 1 wherein there is shown the feed end cap 3, the product end cap 4, the air exit port 5, the air inlet port 6, the refractory lining 8, the air conduction system 9, and, three zones designated A, B, and C, which will be discussed infra. Further shown in the feed cap 3 is the flue gas exit port 10 and the waste fee port 11.

With regard to FIG. 2, zone A is a waste drying zone and does not require the refractory tiles of the instant invention and therefore, the refractory lining in this zone can be standard refractory tiles 13. However, it is contemplated that the tiles of this invention can also be used if the particular process required them to be in that zone. This zone constitutes on the order of about twenty percent of the interior volume of the cylindrical element 2.

In addition, there is shown zone B, which is the combustion zone, which constitutes on the order of about sixty to seventy percent of the interior volume of the cylindrical element 2. Because zone B is the combustion zone, this zone should be lined with a multiplicity of the inventive tiles of this invention. Zone C is the ash cooling segment and this constitutes on the order of about twenty percent of the total interior volume of the cylindrical element 2. Since this zone is not a combustion zone, the lack of direct air through the inventive tile 23 is acceptable, and thus, one need not provide this zone with a refractory tile of this invention and one can use standard tile 13 in this zone.

However, as above, the particular process may require the use of the inventive tile 23 of this invention in this zone and such a use is contemplated within the scope of this invention.

Thus, it is contemplated within the scope of this invention to use a multiplicity of the tile 23 in the refractory lining 8 in combination with standard tile 13, and it is also contemplated within the scope of this invention to provide for the whole of zone B to be made up of the inventive tile 23.

During processing, air is introduced into the air conduction system 9, and the air is allowed to move through the air conduction system 9 and some of it escapes through the air exit port 5. However, a certain portion of the air is conducted to zone B, wherein it moves into the refractory tiles through open air shafts which will be discussed infra. The movement of the air in this manner differs from some of the prior art, in which air is introduced directly into the cylindrical element 2 through the product end cap 4, and directly into the combustion zone B.

When air is introduced as stated in the prior art, the method is ineffective in that a lot of the air moves through the gasifier and exits with the flue gas and is lost. Also, the control of combustion is difficult in that the air is not moved to the combustion mass in a constant and consistent manner such that the rate that each portion of the combusting mass uses is inconsistent and therefore, the combustion is inconsistent and permits the huge build up of slag. Removing the slag is a major problem and often leads to a clogged gasifier and provides other major problems, including a large amount of ash that has to be collected and handled.

It should be noted by those with ordinary skill in the art, that the gasifier is normally tilted such that the feed end of the gasifier is higher than the product end. This is to facilitate the movement of the waste through the gasifier 1 as the gasifier 1 rotates during operation.

Turning now to FIG. 3, which is an elevation of the feed end of the gasifier 1. Shown is the hollow core 12, which is formed by the placement of the standard refractory tiles 13 to form the standard refractory lining 14. Positioned on the outer surface 15 of the standard refractory lining 14 is a first metal shell 16, which provides the integrity to hold the refractory lining 14 together and in place. It should be understood at this point that the elevation does not show the refractory lining 8 containing the inventive tiles 23 and such illustration can be found in FIGS. 2 and 8.

There is a second metal shell 17, which is a metal cover 18 over insulation 19 over the entire cylindrical portion 2 of the gasifier 1. The placement of the first metal shell 16 and the second metal shell 17 is such that a hollow air conduction system 9 is formed essentially the full length of the cylindrical portion 2. The first metal shell 16 has a multiplicity of openings 21 (shown in detail in FIG. 5) which allow the air to move from the air conduction system 9 to the refractory tiles 23 of this invention. Zone B is the preferred zone for the use of the inventive tiles herein although, it is contemplated within the scope of this invention to use the inventive tile 23 in zones A and C as well, depending on the type of waste that is being processed, among other factors.

There is shown a certain amount of waste matter 22 in the bottom of the gasifier 1, that is being processed. As will be discussed infra, the ceramic ball valves 20 of this invention open when the tiles 23 arrive at approximately point D, shown on FIG. 3, during the rotation of the gasifier, and the ball valve 20 closes when the tiles 23 arrive at approximately Point E, also shown on FIG. 3. This means that the air is moved to and circulated intimately with the waste during rotation from point D to point E, and then the ball valves 20 stay closed cutting off air supply through the upper most ball valves 20 until the ball valves 20 rotate through and again arrive at point D. The valves, in combination with the air pressure behind them also operate to prevent air and flue gas from returning to the air conduction system 9. In this manner there is a continuous, controlled flow of air through just the waste 22 that is being processed.

Figure 4:
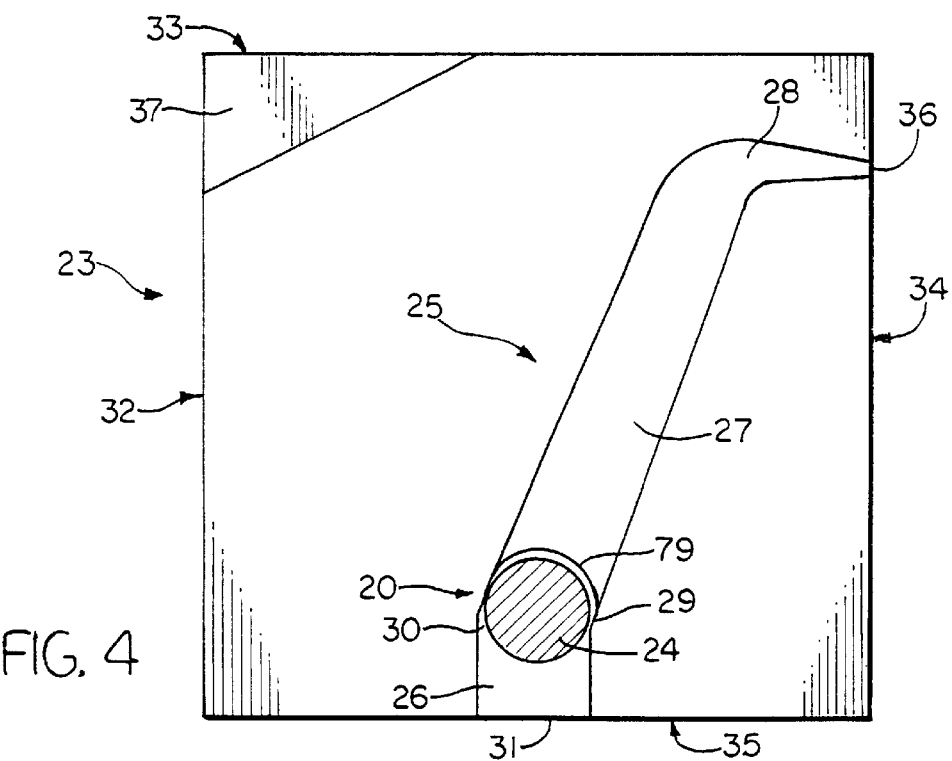
FIG. 4 is a side view of one-half of a tile of this invention showing essentially the center configuration of the tile with the ball of the ball valve being shown in cross section.

Preferred for this invention are refractory tiles 23 that are put together using two halves. Thus, when the tiles 23 are molded from ceramics, they are usually molded in halves and joined together by mortar to form the whole tile 23. Turning to FIG. 4, which is a side view of a molded one-half of a tile 23, wherein the ceramic ball 24 of the ball valve 20 is shown in cross section, there is shown one-half of the tile 23, the air shaft 25 generally, the vertical segment 26, the non-vertical segment 27, and the horizontal segment 28. The terms "vertical", "non-vertical", and "horizontal" are used herein to identify and name the various segments of the air shaft and such use should not be construed as requiring that the vertical segment be exactly vertical, that the horizontal segment be exactly horizontal, and that non-vertical be construed as being horizontal. Deviations in design are contemplated within the scope of this invention as long as such deviations are not unreasonable with regard to the efficient operation of the air shaft 25 in this invention.

As can be observed from FIG. 4, the vertical segment 26 is large enough to allow the ceramic ball 24 to move freely within it. It can also be observed, that the non-vertical segment 27 has a diameter at the bottom 29 smaller than the diameter of the vertical segment 26 is at the top 30. This difference in diameter allows for the ceramic ball 24 to be seated in the bottom 29 of the non-vertical segment 27 and cut off any air that is being passed from the bottom 31 of the vertical segment 26. Also shown is the front 32, top 33, back 34, and bottom 35 of the tile 23.

It is contemplated within the scope of this invention that the difference in diameters as set forth just supra is the preferred method of creating the constriction at the top 30 of the vertical segment 26, however, it is further contemplated within the scope of this invention that a ball valve seat 79 can be placed in the bottom of the non-vertical segment 29 to provide for a seal at this point.

Figure 5:
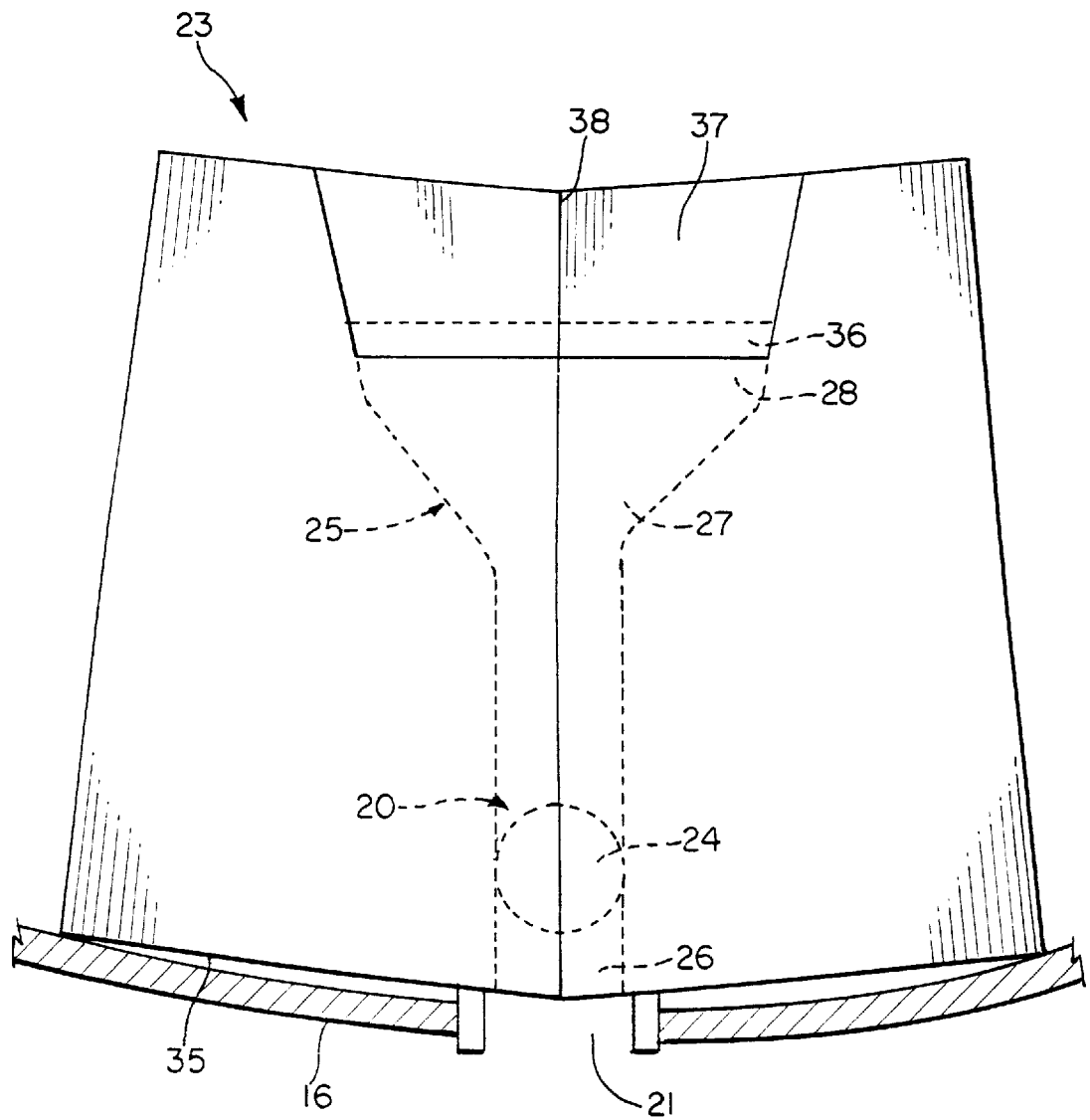
FIG. 5 is a full front view of a tile of this invention and also showing a portion of a steel shell that covers the outside surface of the tile.

To provide a clearer understanding of the inventive refractory tile 23 of this invention, reference can be made to FIG. 5, which is a full front view of a tile 23 wherein there is shown a seg line 38, which is a mortar joint between the two halves of the tile 23, and the ball joint 20. The air shaft 25 is shown in phantom, along with the leading edge 36 of the flared horizontal segment 28 of the air shaft 25. Also shown in phantom is the ceramic ball 24.

Further, a portion of first metal shell 16 is also shown in cross section and it is attached to the bottom 35 of the refractory tile 23 in order to illustrate the means by which the air reaches the air shaft 25.

Figure 6:
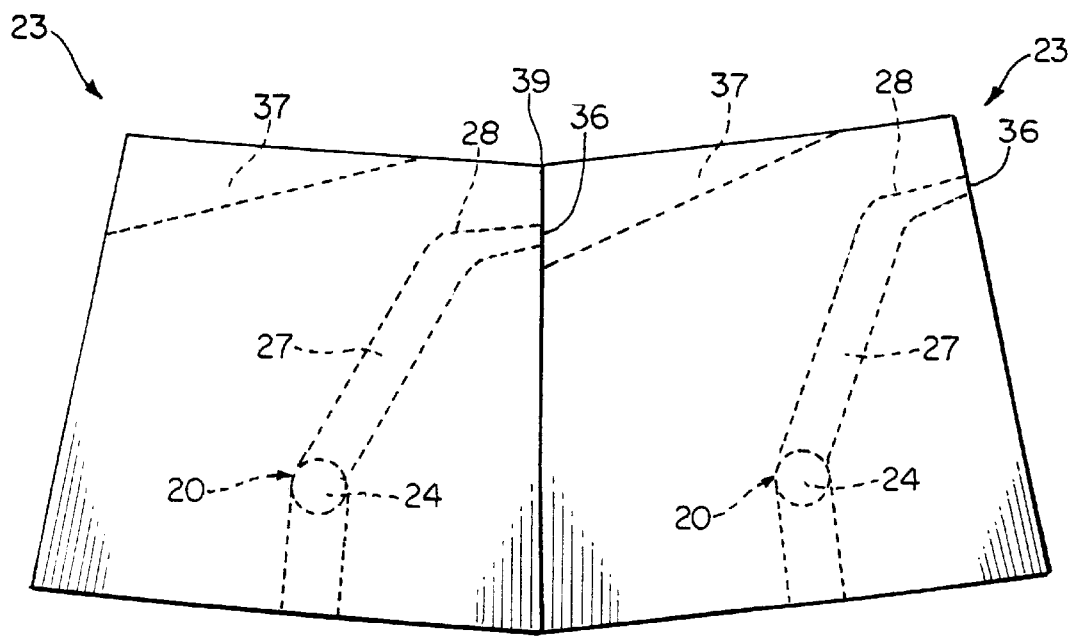
FIG. 6 is a full side view of two tile of this invention mortared together and showing the air shafts of the tile and the delivery notch of the tile in phantom.

Thus, in FIG. 5, there is shown one of the openings 21, much enlarged to show its general construction. These openings 21 are directly open to the hollow air conductive channel 9. The gasifier 1 is air pressurized during operation, by pushing pressurized air through the air inlet port 6 shown in FIG. 6. The pressurized air fills the hollow air conduit 9 and completely surrounds the outside steel shell 16 and moves to the air exit port 5 for removal of a portion of the air from the system. During the passage of air through the hollow air conduction channel 9, and as the gasifier 1 rotates, the ceramic ball 24 opens and closes the air shaft 25 to allow air to move into the waste mass 22 (FIG. 3) or prevent air moving into the waste mass 22.

As noted supra, and with reference to FIG. 3, the ball valves 20 each open at about point D in the rotation and stay open until they reach about point E, where the ceramic ball 24 moves down in the vertical segment 26, lodges in the constriction at about point 29 and seals and cuts off the flow of air to the waste mass 22. Thus, the tile 23 that are directly under the waste mass 22 allow the flow of air to the waste mass 22, while the tile 23 over the top of the waste mass 22 do not provide any air to the system. By this means, the air flow to the waste mass 22 is highly controllable and therefore, makes the unit much more efficient in terms of controlling heat within the unit, makes the unit more effective in converting the mass to gases rather than slag, along with other major advantages.

In addition to the advantage obtained by the use of the ball valve control of air, there is also another feature that adds to the efficiency of the unit.

Reference should be made to FIG. 4. and FIG. 5. It can be noted from FIG. 5 that the upper portion of the non-vertical segment 27 is flared. Not desiring to be limited the inventor herein declares that, "flared" within this specification and claims has a meaning which is essentially based on the jets and nozzles as shown in "Engineers" Illustrated Thesaurus, by Herkimer, H., Wm. Penn Publishing Corp., New York, N.Y., Chemical Publishing Co., Inc. pages 348 and 349, wherein there is shown a multiplicity of nozzles and jets, it being understood that the criticality of the flare herein is that the air delivery system of this invention is a blast tuyere and is not a single point of exit from the air shaft, reference is made to jet E, blast tuyere and jet A, Rose jet for spreading, i. e. "flared". The leading edge 36 of the horizontal segment 28 of the tile 23, for purposes of this invention is a blast tuyere jet which is spread, i. e. "flared". It should be noted that the horizontal segment 28 is flared and that the exit point, that is the leading edge 36 of the horizontal segment 28 is several times wider than the lower portion of the non-vertical segment 27.

Further, one needs to note from FIGS. 4 and FIG. 5, the presence of an air delivery notch 37. The significance of this delivery notch 37 can be observed from FIG. 6, which shows a side view of two of the tile 23 of this invention mortared together as they would be in the refractory lining 8 of the gasifier 1. The front 32 of each of the tile 23 is to the left of FIG. 6 and the back 34 of the tile 23 is to the right of FIG. 6. What is shown is a mortar line 39, with the delivery notch 37, the ball valve 20, the horizontal segment 28, the non-vertical segment 27, the ceramic ball 24, the vertical segment 26, all in phantom. It is to be noted that the leading edge of the horizontal segment 28 opens onto the deep surface of the notch 37 at the front of the adjacent tile 23. This form of delivery enhances the movement of the air through the system and enhances the volume of air that can be delivered to the waste mass 22. It is contemplated within the scope of this invention that other configurations of nozzles and jets can be used herein to move and control the air, for example, those shown in Herkimer, supra, but the system just described is the preferred embodiment of this invention.

Figure 7:
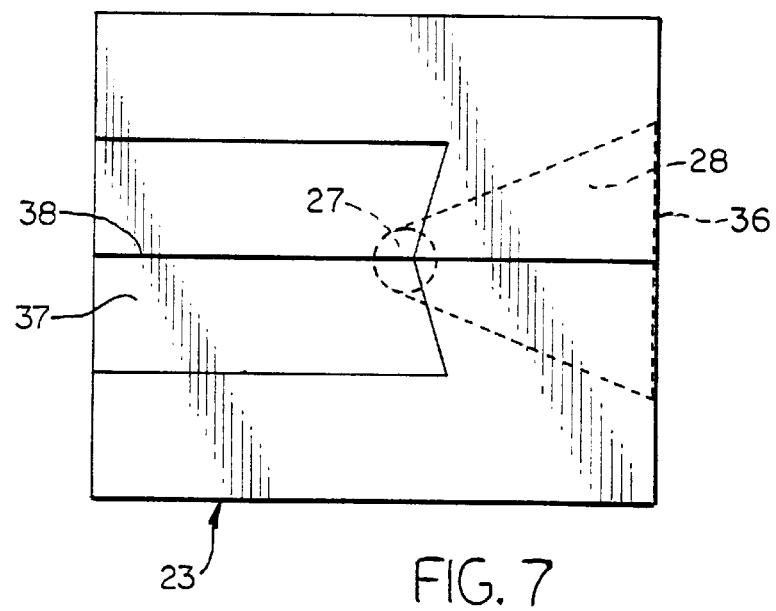
FIG. 7 is a full top view of a tile of this invention.

A further view of the air shaft 25 is that shown in FIG. 7, which is a full top view of a tile 23 of this invention, showing the front 32, the back 34, the top 33, the delivery notch 37, the seg line 38, and in phantom, the ascending portion of the non-vertical segment 27, the horizontal segment 28, and the leading edge 36 of the horizontal segment 28, showing the "flare" therein.

Figure 8:
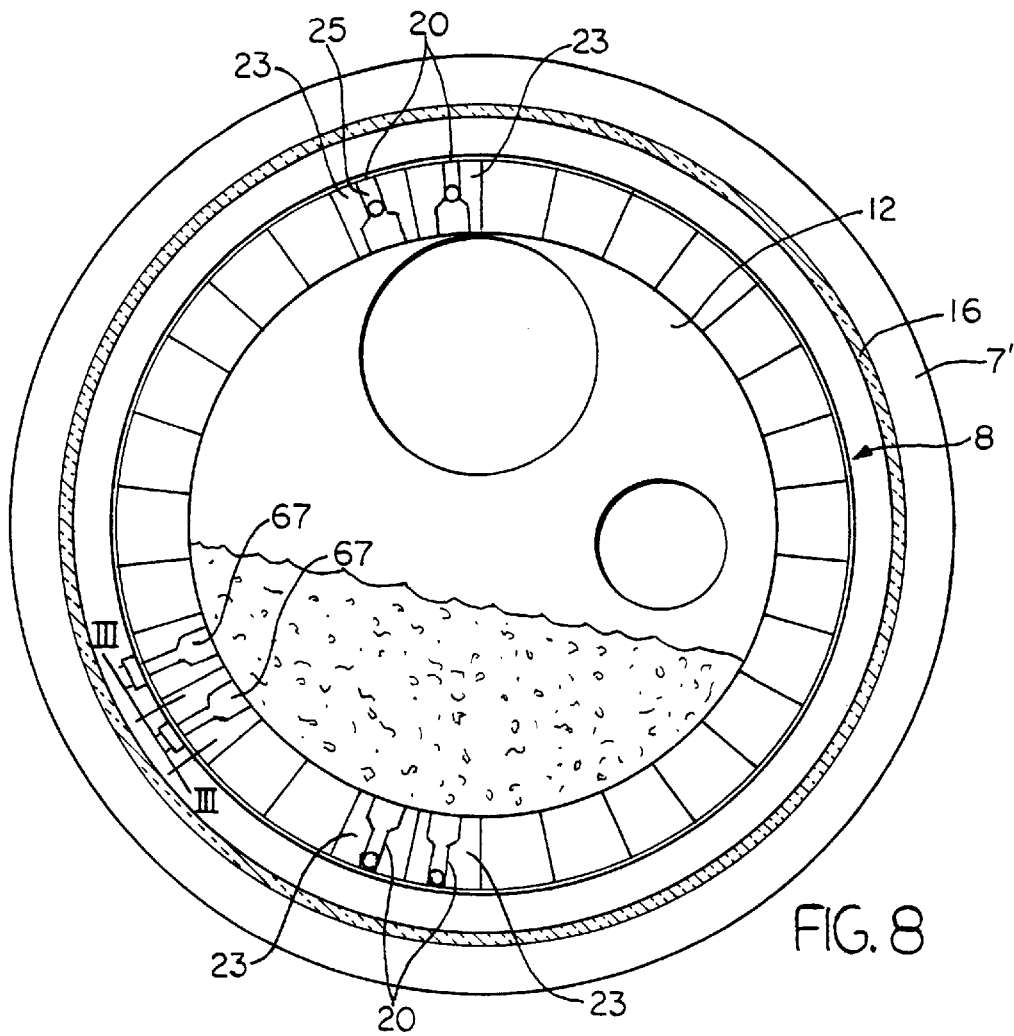
FIG. 8 is a cross sectional view of FIG. 2, through the lines II—II of FIG. 2 showing ball valves 20 in the open position at the bottom of the figure, and ball valves closed at the top of the figure. This Figure also shows two of the cap type valves 67 of this invention at the left hand side of the Figure.

Reference can now be made to FIG. 8, which is a cross sectional view through the steel shell 16 and the refractory core 8 of the gasifier 1 through line II—II of FIG. 2 to show the tile 23 of this invention which form the refractory core 8. Also shown is the hollow core 12, the rotating means 7', steel shell 16, and the air shafts 25.

It is contemplated within the scope of this invention to use a multiplicity of the tile 23 in the refractory lining 8 in combination with standard tile 13, and it is also contemplated within the scope of this invention to provide for the whole of zone B to be made up of the inventive tile 23.

Figure 9:
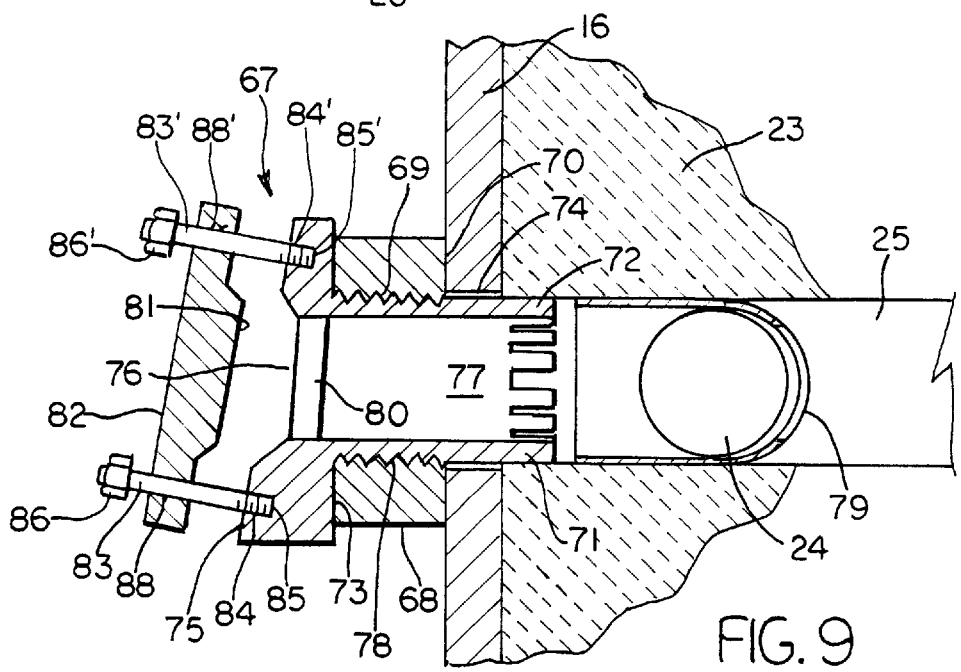
FIG. 9 is a partial cross sectional view of the cap type valve taken through line III—III of FIG. 8 showing the detail of the cap type valve 67.

Turning now to FIG. 9, there is shown a partial cross sectional view of the cap type valve taken through line III—III of FIG. 8 showing the detail of the cap type valve 67.

In detail, there is shown a tile 23, steel shell 16, the bottom half of the air shaft 25, and the cap sealing mechanism 67.

The cap sealing mechanism 67 comprises a collar 68, wherein the collar has threads 69 on the inside surface thereof. There is a back surface 70 which is bonded to the steel shell 16 to stabilize it.

There is a plug 71 having a distal end 72, a near end 73, and a center tubular opening 77, the distal end 72 being insertable through an opening 74 in the steel shell 16 and on into the air shaft 25. The near end 73 has integrally mounted on it a flared edge 75. There is a centered opening 76 through the flared portion essentially aligning with the center tubular opening 77 of the plug 71. The plug 71 is threaded on its outer surface 78, which threads accommodate the internal surface threads 69 of the collar 68. The centered opening 76 has a seating surface 80 situated in it, to accommodate the back surface 81 of the cap 82 to provide a sealing means for the air shaft 25.

The cap 82 is slidably mounted on at least two pins 83 and 83' which are attached to the flared edge 75 at their near ends 85 and 85', respectively and their distal ends 86 and 86', respectively are capped by lock nuts 87 and 87', respectively, or some such other device to prevent the cap 82 from leaving the pins 83 and 83'. Shown for purposes of illustration only are pins 83 and 83' threaded into threaded holes 84 and 84'. It should be noted that the length of the pins 83 and 83' must be such that the cap 82 can slide up and down on them. Thus, the pins 83 and 83' must have a length in excess of the thickness of the cap 82 at its outer edges.

The cap 82 has openings 88 and 88', which allows the cap 82 to slide up and down on such pins 83 and 83'.

When the tile 23, containing the above-described, cap sealing mechanism is rotated to the bottom of the rotation, the cap 82 remains open and allows air to circulate to the waste mass and when the tile 23 is rotated to the top of the rotation, the cap 82 closes and prevents air from entering the kiln, and prevents flue gas from entering the air conduction system 9.

A variation of the ball valve can be found in FIG. 10, which is one half of a tile 23 of this invention wherein there is shown the ball valve being substituted by a needle valve 89 wherein the needle 90 is shown in cross section, as is the needle seat 84.

Another variation of the cap 82 shown in FIG. 11 is the needle cap 91 which is similar to the cap 82, but has a needle point 92 projecting from the back surface 81 of the cap 91. There is also provided a seating mechanism 93 for the needle point 92 to provide sealing when the cap 91 slides down the pins 83 and 83' and allows the needle point 92 to contact the seating mechanism 93.

Figure 12:
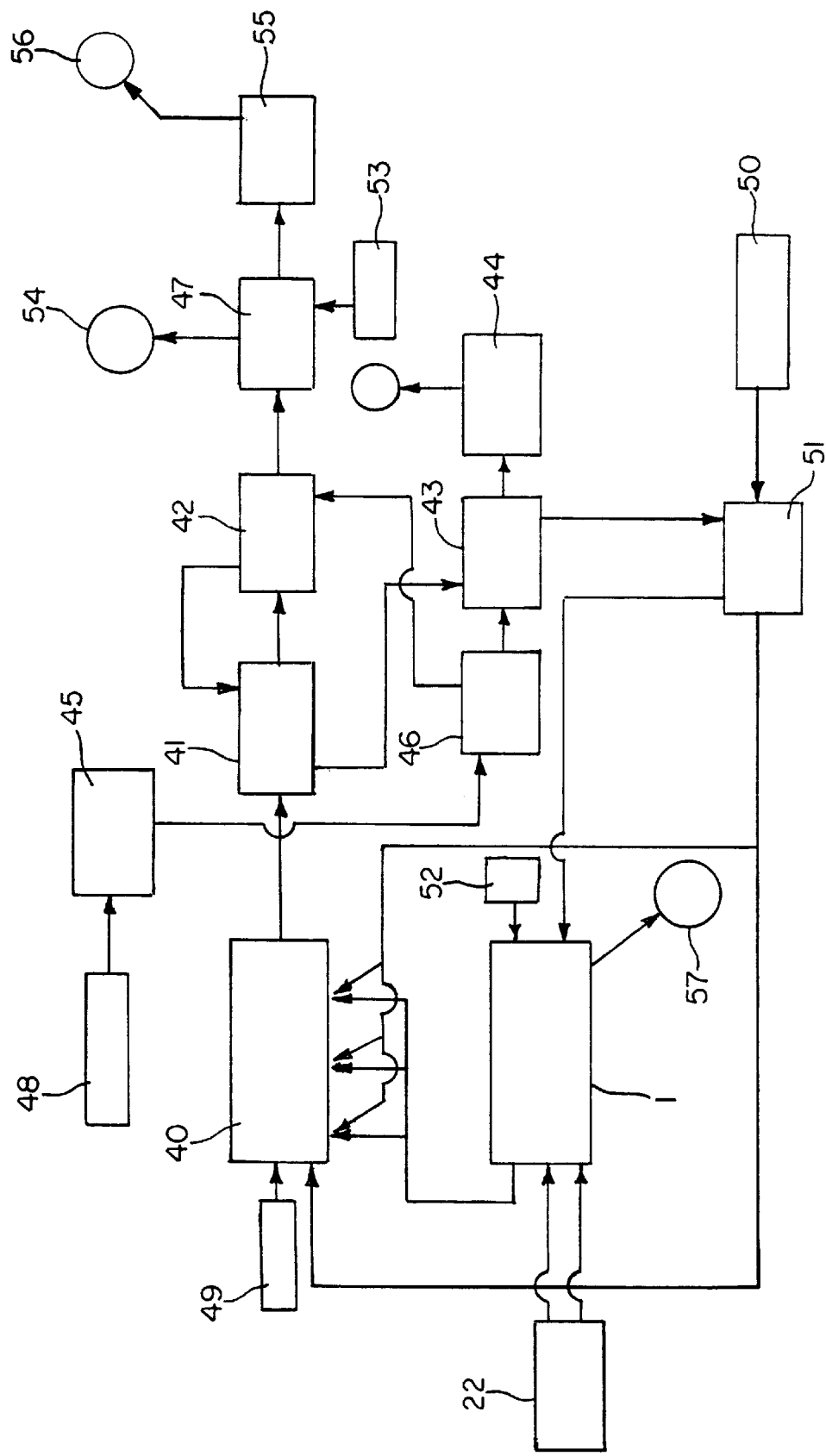
FIG. 12 is a schematic diagram of one system of this invention.

Turning now to a further embodiment of this invention, there is shown in FIG. 12, which is a schematic diagram of a waste to energy system comprising the use of a gasifier 1 described supra. For purposes of illustration, FIG. 12 generally represents a co-generation steam/power plant design that can be useful.

The system is comprised of at least a gasifier 1 of this invention; an oxidizer 40, an air-to-air, all-ceramic heat exchanger 41, a high pressure, medium temperature, alloy metal air-to-air heat exchanger 42, a gas turbine 43, a generator operating from the gas turbine 44, a filter 45, and a compressor 46, driven by the gas turbine 43 and feeding the high pressure medium temperature, alloy metal air-to-air heat exchanger 42.

The gasifier 1 of this invention is generally run in a starved air mode. The starved air gasifier operates with a small amount of combustion air. The combustible flue gas is sent to the oxidizer 40 wherein preheated air from the gas turbine 43 in the system is staged into the chamber of the oxidizer 40 and mixed with the flue gas at controlled temperatures. This tends to keep the formation of $NO_x$ well below all codes, even when one is destroying high nitrogen wastes such as chicken litter.

There is also used a two-stage heat exchanger. The first stage is a special all-ceramic, high pressure, high temperature, air-to-air heat exchanger 41 that will indirectly heat air up to 2000° F. This heat exchanger 41 has to be constructed of materials that can withstand slagging and acid attack. Such special heat exchangers are disclosed in U.S. Pat. No. 5,775,414, which issued on Jul. 7, 1998 to Graham. The second stage of the heat exchanger is a conventional, high pressure, medium temperature, alloy metal exchanger 42.

When acids are generated above code levels in the gasifier 1 and/or oxidizer 40, a lime injector, fabric filter air pollution control train can be added (not shown). When burning materials such as wood waste, poultry litter, manure, industrial trash, etc., an air pollution control device will always be required.

The gas turbines 43 useful in this system are those in which the compressor 46 will use filtered air, compress it to about 180 psig and send it directly to the alloy heat exchanger 42. The ceramic heat exchanger 41 is designed to forward the air at design temperatures and pressures to the gas turbine 43. The gas turbine 43 discharges heated air at about 900° F. which can be sent to the gasifier 1 and/or oxidizer 40 to initially dry wastes that are being fed to the gasifier 1. This heated air is also useful to combust organic materials in the waste.

In the matter of co-generation, when wastes are low in water and/or ash with a corresponding high heating value, surplus energy from the alloy heat exchanger flue gas and gas turbine exhaust air can be used to combust fossil fuel in a low pressure waste heat boiler 47 for heating and/or process purposes.

Also shown in FIG. 12 is the addition of ambient air 48 to the filter 45, the addition of auxiliary fuel 49 to the oxidizer 40, the addition of ambient air 50 to the air mixer 51, the addition of auxiliary fuel 52 to the gasifier 1, feed water 53 to the boiler 47, and, the feeding of the waste 22 to the gasifier 1.

It will be noted further that the air mixer 51 feeds air to the gasifier 1, the oxidizer 40 and additionally feeds air into the process gas from the gasifier 1 which process gas is forwarded to the oxidizer 40 after the mixing of the air.

The ceramic heat exchanger 41 feeds high temperature air to the gas turbine 43, the staged oxidizer 40 feeds high temperature flue gas to the ceramic heat exchanger 41, which in turn is fed from the ceramic heat exchanger 41 to the alloy heat exchanger 42 and then at a lower temperature to the boiler 47 with the commensurate delivery of saturated steam 54. Heated air from the boiler is then vented to stack 55, aided by a fan, and then such air exits the stack as flue gas 56. Finally, there is shown the provision of ash 57 from the gasifier 1.

Figure 13:
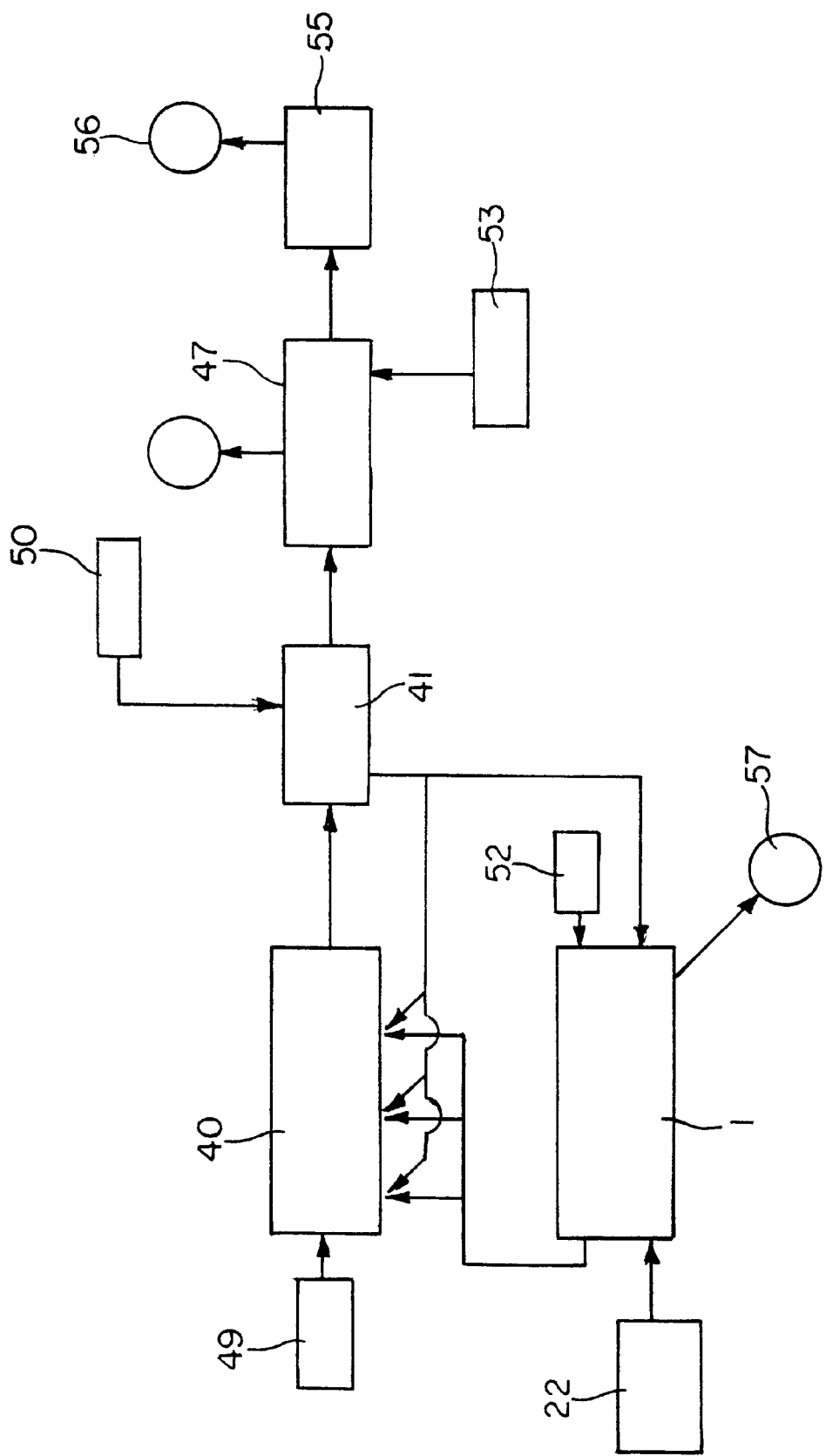
FIG. 13 is a schematic diagram of one other system of this invention.

For comparison purposes, a simplified waste energy system can be found in FIG. 13, wherein there is shown a schematic of a simple steam plant that burns biomass.

There is shown an oxidizer 40, a starved air gasifier 1, waste mass 22 being fed to the gasifier 1, auxiliary fuel 49 being fed to the oxidizer 40, auxiliary fuel 52 being fed to the gasifier 1, ash 57 delivered from the gasifier 1, high temperature flue gas from the oxidizer 40 to the ceramic heat exchanger 41, ambient air 50 being fed into the ceramic heat exchanger 41, high temperature air being fed into the boiler and economizer 47, low temperature air being fed into the stack 55, resulting in low temperature flue gas 56 being exhausted from the stack 55, and feed water 53 being fed into the boiler 47.

Figure 14:
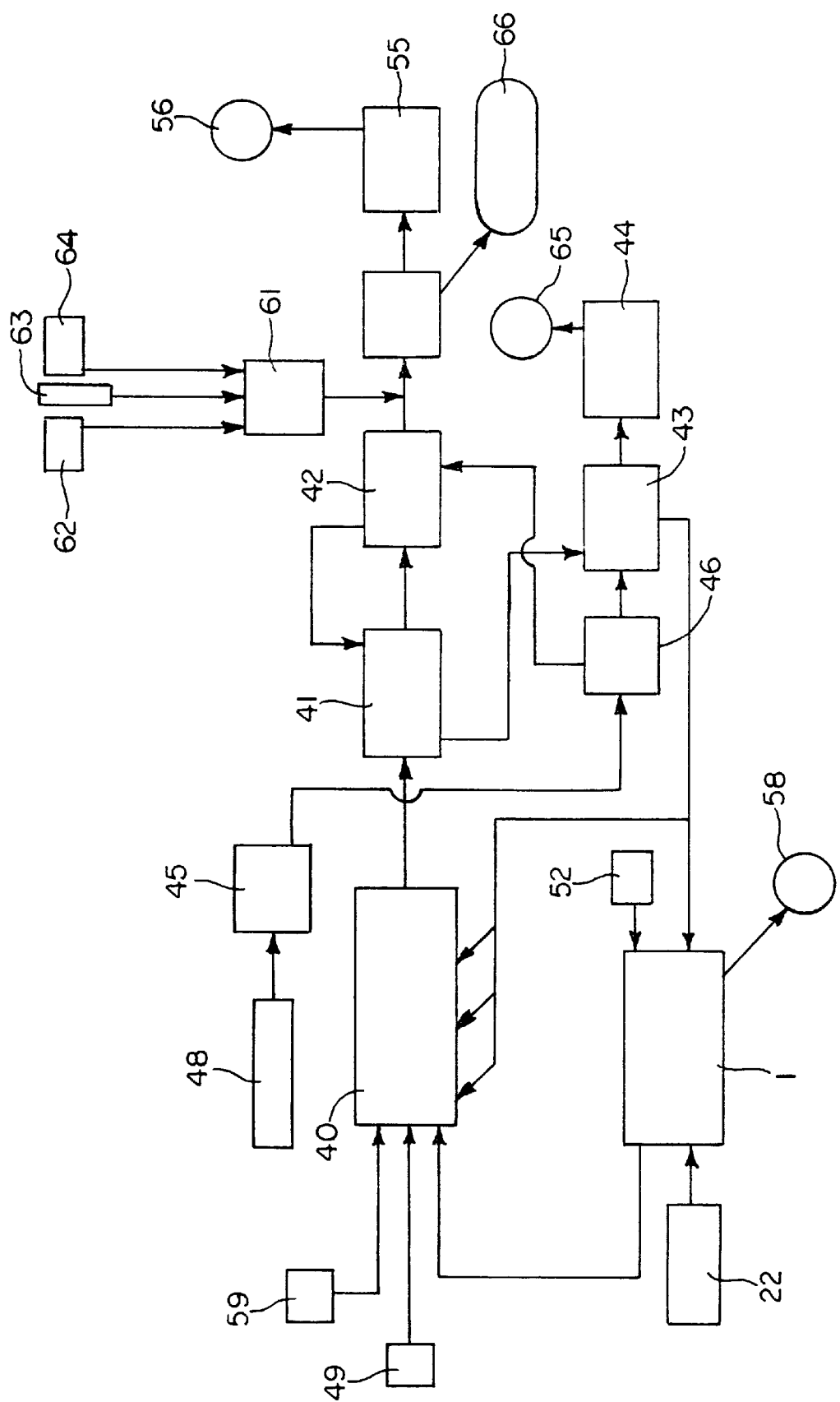
FIG. 14 is a schematic diagram of yet another system of this invention.

For further comparison purposes, a landfill gas, leachate evaporation, direct-fired gas turbine system is shown in FIG. 14. In FIG. 14, those elements shown in the systems discussed supra that are common are the oxidizer 40, the filter 45 being fed ambient air 48, the auxiliary fuel feed 52, the ceramic heat exchanger 41, the alloy heat exchanger 42, the stack 55, the flue gas exhaust 56, the air compressor 46 for the gas turbine 43, and the power generator 44. In addition, there is shown the solids 58 from 1, which may include ash, but owing to the particular process, are more than ash, landfill gas 59 being fed into the oxidizer 40, a baghouse 60 being fed from the alloy heat exchanger 42 after treatment from the lime injector 61. The lime injector consists of lime feed 62, air 63, and water 64. The subprocess in the bag house 60 results in the generation of particulate 66, which can be landfilled. Also shown is the power 65 generated by the generator 44.

Figure 15:
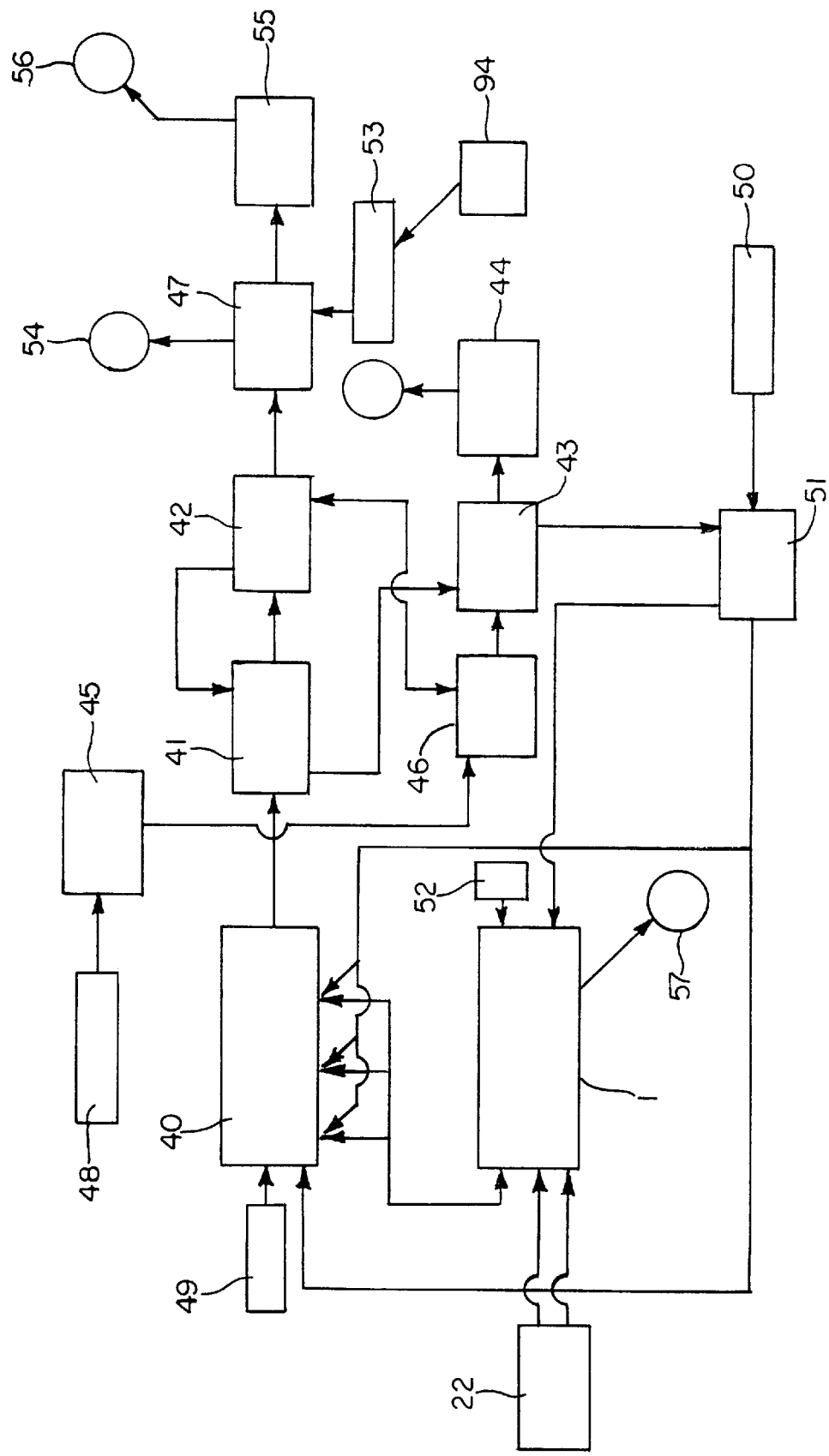
FIG. 15 is a schematic diagram of FIG. 12 with the added feature that a water condensor is added as 94.

Another convenient system is that found in FIG. 15 wherein there is shown the use of a water condensor 94 and the movement of condensed water from that condenser to the feed water.

Figure 16:
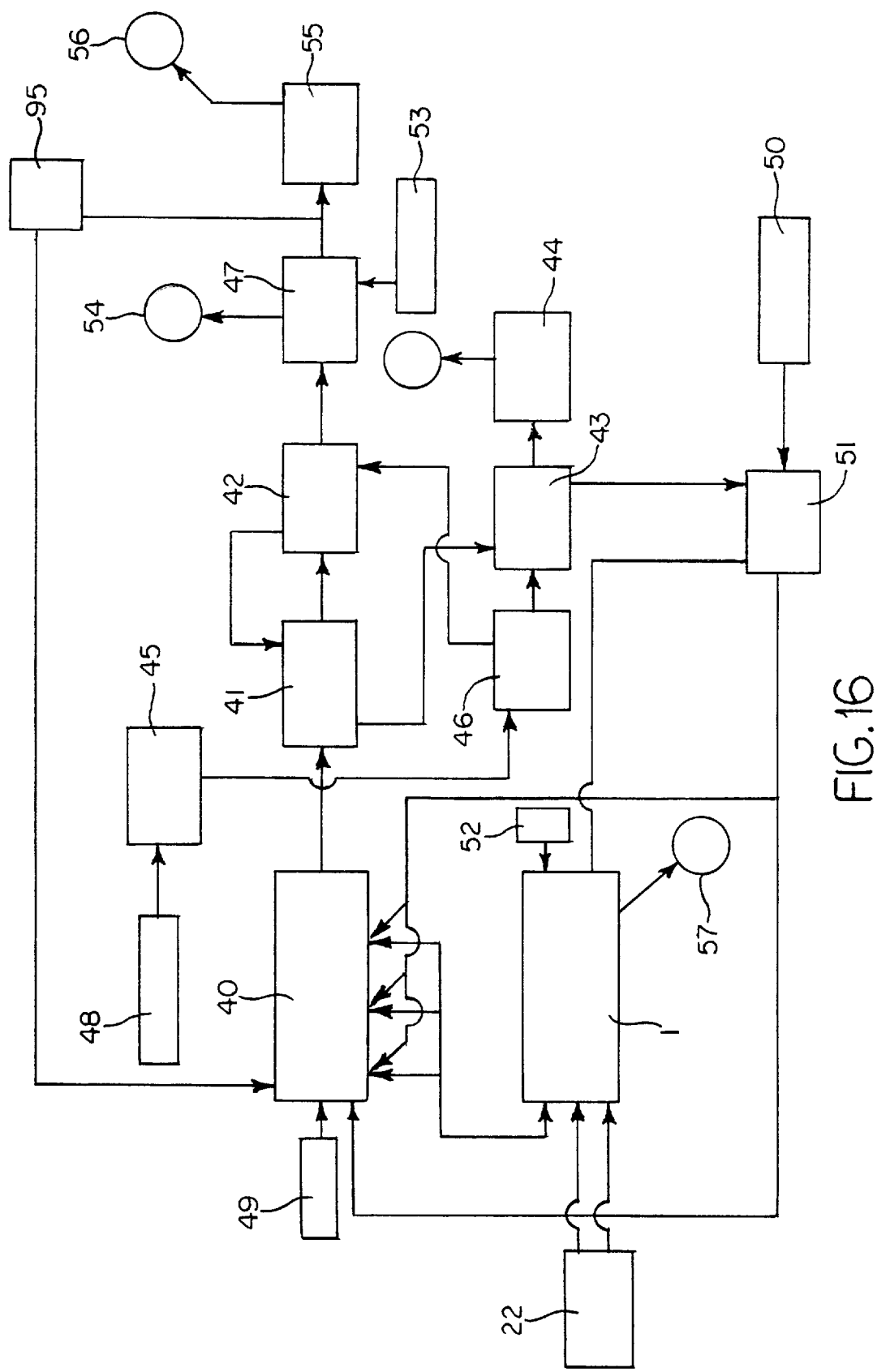
FIG. 16 is a schematic diagram of FIG. 12 with the added feature that an air heater is added as 95.

Yet another convenient system is that found in FIG. 16 wherein there is shown the use of an air heater 95 which funnels heated air to the staged oxidizer to facilitate the heating and control of the heat to the waste mass.

Thus it can be observed that it is contemplated within the scope of this invention to add equipment to the basic system, or to remove certain equipment from the basic system to design a waste to energy system that is compatible for the various types of waste being treated.

Yet another embodiment of this invention is the use of the systems described just above to destroy waste and generate power, the process comprising feeding waste to the gasifier of a waste to energy system as described herein and recovering the power generated by the system.

There are certain advantages to the various embodiments of this invention. For example, one major problem in prior art equipment is slag buildup in the gasifier, especially within the temperature range of 1100° F. to 1400° F., which this invention minimizes. Further, the ability to control air in zone B allows one to keep the temperature in zone A low. In this manner, excess moisture is driven off much easier, which moisture combines with the flue gas which is moving in a reverse direction from the direction of the movement of the waste in the gasifier and is more readily removed. When the waste is rotated slowly, and air is moved through in a controlled fashion, i.e. slowly, a small amount of small particles are produced instead of slag.

Partial or uniform combustion, or complete burnout also leads to reduced slag. Further, it is easy to control burning such that a higher content of carbon is retain in the by-products, which can then be used as fertilizer. In the systems of this invention, only part of the carbon may be burned, i.e. at about one-half or less stoichiometric ratio which leads to carbon monoxide and hydrogen which can be recovered, not carbon dioxide which pollutes the air.

Utilizing the gasifier herein allows one to have essentially a moving grate over which the waste migrates, that automatically closes when the gasifier is at the top of its rotation to give a localized application of combustion versatility, i. e. one can adjust conditions quite easily to fit the materials being burned. This is accomplished without any mechanism inside of the refractory line. Other technologies have tried to bring metal to the interior of the convention gasifiers because there is a major problem with bringing combustion air from either of the two ends of the gasifier. Except for this invention, such a mechanism is not known to the inventor herein and it is believed that such a mechanism does not exist in prior use.

The tiles of this invention are made from silicon carbide/nitride. They are easily cleaned, they are hard and ash releases from them readily. The refractory core is therefore easy to build, and is easily retrofitted.

What is claimed is:

1. A ceramic ball seal refractory tile comprising a refractory tile and contained within said refractory tile, an air shaft, wherein the air shaft has contained therein a ceramic ball which acts as an intermittent seal for the air shaft.

2. A ceramic ball seal refractory tile comprising:
  A. a ceramic refractory tile;
  B. an air shaft;
  C. a ceramic ball and,
  D. a delivery notch,
  wherein the refractory tile is a high temperature ceramic refractory tile having a top, a bottom, a front and a back, the ceramic refractory tile having contained therein an air shaft which air shaft comprises:
    (i) an essentially vertical segment opening through the bottom of the refractory tile, said vertical segment having a bottom edge and said vertical segment having a generally cylindrical configuration;
    (ii) a flared, essentially horizontal segment opening through the back of the refractory tile and near the top of the refractory tile and,
    (iii) a non-vertical segment providing a continuous conduit from the vertical segment to the horizontal segment, said non-vertical segment having a top half and a bottom half, the top half being flared and the bottom half being essentially cylindrical;
  said air shaft having a reduced neck at about the connecting point of (i) and (iii) to form a constriction in the air shaft which constriction provides for retaining the ceramic ball such that the ceramic ball can seat in said constriction to prevent the flow of air therethrough;
  the delivery notch being located in the top of said refractory tile, at the front thereof, the depth of said notch at the front of the refractory tile being deeper than the exit point of (ii) at the back of the refractory tile, the width of said notch at the front of the refractory tile being at least as wide as the flare of (ii) at the back of said refractory tile.

3. A controlled air continuous gasifier containing a plurality of refractory tile of claim 1.

4. A waste to energy system employing a controlled air continuous gasifier as claimed in claim 3.

5. A waste to energy system as claimed in claim 4 in which the system is a co-generation plant that fires waste.

6. A waste to energy system as claimed in claim 5 in which the waste is biomass.

7. A controlled air, continuous gasifier, said gasifier comprising:
  (i) a cylinder having a feed end and a product end;
  (ii) a feed end cap on the feed end of the cylinder;
  (iii) a product end cap on the product end of the cylinder;
  (iv) a product exit port in the product end cap;
  (v) a flue gas exit port in the feed end cap;

(vi) a waste feed port in the feed end cap;

(vii) at least one air injection port near the product end cap;

(viii) at least one air exit port near the feed end cap;

(ix) a means for allowing rotation of the gasifier, wherein the cylinder comprises:

a. a refractory lined open center core running essentially the full length of the cylinder, said refractory lining having an inside surface and an outside surface;

b. a first metal shell covering the entire outside surface of the refractory lining, said first metal shell having an outside surface;

c. an insulated second metal shell formed adjacent to, and conforming to, the outside surface configuration of the first metal shell such that there is a hollow core provided between the first metal shell and the second metal shell, wherein, the refractory lining is a ceramic ball seal refractory tile comprising:

A. a ceramic refractory tile;

B. an air shaft;

C. a ceramic ball and,

D. a delivery notch, wherein the refractory tile is a high temperature ceramic refractory tile having a top, a bottom, a front and a back, the ceramic refractory tile having contained therein an air shaft which air shaft comprises:

(i) an essentially vertical segment opening through the bottom of the refractory tile, said vertical segment having a bottom edge and said vertical segment having a generally cylindrical configuration;

(ii) a flared, essentially horizontal segment opening through the back of the refractory tile and near the top of the refractory tile and, (iii) a non-vertical segment providing a continuous conduit from the vertical segment to the horizontal segment, said non-vertical segment having a top half and a bottom half, the top half being flared and the bottom half being cylindrical;

said air shaft having a reduced neck at about the connecting point of (i) and (iii) to form a constriction in the air shaft which constriction provides for retaining the ceramic ball such that the ceramic ball can seat in said constriction to prevent the flow of air therethrough;

the delivery notch being located in the top of said refractory tile, at the front of the refractory tile, the depth of said notch at the front of the refractory tile being deeper than the exit point of (ii) at the back of the refractory tile, the width of said notch at the front of the refractory tile being at least as wide as the flare of (ii) at the back of the refractory tile.

8. A waste to energy system comprising in combination at least:

a. a gasifier of claim 7;

b. an oxidizer;

c. an air to air, all-ceramic heat exchanger;

d. a gas turbine;

e. a generator operated from the gas turbine;

f. a filter and compressor driven by the gas turbine.

9. A waste to energy system as claimed in claim 8, wherein there is additionally used an auxiliary fuel supply system.

10. A waste to energy system as claimed in claim 9 wherein the auxiliary fuel supply system feeds into the gasifier.

11. A waste to energy system as claimed in claim 9 wherein the auxiliary fuel supply system feeds into the oxidizer.

12. A waste to energy system as claimed in claim 9 wherein the auxiliary fuel supply system feeds into both the gasifier and the oxidizer.

13. A waste to energy system as claimed in claim 9 wherein the auxiliary fuel is waste fuel.

14. A process of treating waste to create power, the process comprising feeding waste to the gasifier of a waste to energy system as claimed in claim 8, and recovering the power generated by the system.

15. A process as claimed in claim 14 in which steam is generated and recovered as power.

16. A process as claimed in claim 14 in which electrical power is generated and recovered.

17. A waste to energy system comprising in combination at least:

a. a gasifier of claim 7;

b. an oxidizer;

c. an air to air, all-ceramic heat exchanger;

d. a high pressure, medium temperature, alloy metal air-to air heat exchanger;

e. a gas turbine;

f. a generator operated from the gas turbine;

g. a filter and compressor driven by the gas turbine.

18. A waste to energy system as claimed in claim 17, wherein there is additionally used an auxiliary fuel supply system.

19. A waste to energy system as claimed in claim 18 wherein the auxiliary fuel supply system feeds into the gasifier.

20. A waste to energy system as claimed in claim 18 wherein the auxiliary fuel supply system feeds into the oxidizer.

21. A waste to energy system as claimed in claim 18 wherein the auxiliary fuel supply system feeds into both the gasifier and the oxidizer.

22. A waste to energy system as claimed in claim 18 wherein the auxiliary fuel is waste fuel.

23. A process of treating waste to create power, the process comprising feeding waste to the gasifier of a waste to energy system as claimed in claim 18, and recovering the power generated by the system.

24. A process as claimed in claim 23 in which steam is generated and recovered as power.

25. A process as claimed in claim 23 in which electrical power is generated and recovered.

26. A ceramic cap-sealable, refractory tile for a kiln having an outside surface, said tile comprising:

A. a ceramic refractory tile;

B. an air shaft having a near end and a distal end;

C. a delivery notch, and,

D. a cap sealing mechanism, wherein the refractory tile is a high temperature ceramic refractory tile having a top, a bottom, a front and a back, the ceramic refractory tile having contained therein an air shaft which air shaft comprises:

(i) an essentially vertical segment opening through the bottom of the refractory tile, said vertical segment having a bottom edge and said vertical segment having a generally cylindrical configuration;
(ii) a flared, essentially horizontal segment opening through the back of the refractory tile and near the top of the refractory tile and,
(iii) a non-vertical segment providing a continuous conduit from the vertical segment to the horizontal segment, said non-vertical segment having a top half and a bottom half, the top half being flared and the bottom half being essentially cylindrical;
said cap sealing mechanism comprising:
(a.) a collar, said collar having a threaded inside surface, and a back surface, said collar being fixedly mounted at the back surface to the outside surface of the kiln;
(b.) a plug having a near end and a distal end, the near end having integrally associated therewith, flared edges and a centered opening with edges, said centered opening commensurate in size to the opening of the bottom half of the air shaft, the distal end of the plug being fixedly attached interior of the air shaft, the near end of the plug being threaded on the outside surface and the near end of said plug being surrounded by the collar;
said centered opening edges having a seating surface therein,
said flared edges of the plug having at least two openings therethrough, each opening capable of receiving a pin therethrough, said pin having a distal end and a near end, said near end of the pin being mounted at the flared edges of the plug;
a cap, said cap having a front surface, a back, and outside edges, said cap having at least two openings through the outside edges thereof, each said opening capable of receiving the pin, each said pin having a length at least in excess of the thickness of the cap, each said pin being capped at the distal end to prevent the cap from moving from the pins;
the back surface of the cap being configured such that it conforms to the seating surface of the centered opening edges and seals said centered opening of the plug when seated therein;
the delivery notch being located in the top of said refractory tile, at the front thereof, the depth of said notch at the front of the refractory tile being deeper than the exit point of (ii) at the back of the refractory tile, the width of said notch at the front of the refractory tile being at least as wide as the flare of (ii) at the back of said refractory tile.

27. A controlled air continuous gasifier containing a plurality of refractory tile of claim 26.

28. A waste to energy system employing a controlled air continuous gasifier as claimed in claim 27.

29. A waste to energy system as claimed in claim 28 in which the system is a co-generation plant that fires waste.

30. A waste to energy system as claimed in claim 29 in which the waste is biomass.

31. A controlled air, continuous gasifier, said gasifier comprising:
(i) a cylinder having a feed end and a product end;
(ii) a feed end cap on the feed end of the cylinder;
(iii) a product end cap on the product end of the cylinder;
(iv) a product exit port in the product end cap;
(v) a flue gas exit port in the feed end cap;
(vi) a waste feed port in the feed end cap;
(vii) at least one air injection port near the product end cap;
(viii) at least one air exit port near the feed end cap;
(ix) a means for allowing rotation of the gasifier,
wherein the cylinder comprises:
a. a refractory lined open center core running essentially the full length of the cylinder, said refractory lining having an inside surface and an outside surface;
b. a first metal shell covering the entire outside surface of the refractory lining, said first metal shell having an outside surface;
c. an insulated second metal shell formed adjacent to, and conforming to, the outside surface configuration of the first metal shell such that there is a hollow core provided between the first metal shell and the second metal shell, wherein,
the refractory lining is a ceramic flap-sealable, refractory tile for a kiln having an outside surface, said tile comprising:
A. a ceramic refractory tile;
B. an air shaft having a near end and a distal end;
C. a delivery notch, and,
D. a cap sealing mechanism,
wherein the refractory tile is a high temperature ceramic refractory tile having a top, a bottom, a front and a back, the ceramic refractory tile having contained therein an air shaft which air shaft comprises:
(i) an essentially vertical segment opening through the bottom of the refractory tile, said vertical segment having a bottom and said vertical segment having a generally cylindrical configuration;
(ii) a flared, essentially horizontal segment opening through the back of the refractory tile and near the top of the refractory tile and,
(iii) a non-vertical segment providing a continuous conduit from the vertical segment to the horizontal segment, said non-vertical segment having a top half and a bottom half, the top half being flared and the bottom half being essentially cylindrical;
said cap sealing mechanism comprising:
(a.) a collar, said collar having a threaded inside surface, and a back surface, said collar being fixedly mounted at the back surface to the outside surface of the kiln;
(b.) a plug having a near end and a distal end, the near end having integrally associated therewith, flared edges and a centered opening with edges, said centered opening commensurate in size to the opening of the bottom half of the air shaft, the distal end of the plug being fixedly attached interior of the air shaft, the near end of the plug being threaded on the outside surface and the near end of said plug being surrounded by the collar;
said centered opening edges having a seating surface therein,
said flared edges of the plug having at least two openings therethrough, each opening capable of receiving a pin therethrough, said pin having a distal end and a near end, said near end of the pin being mounted at the flared edges of the plug;

a cap, said cap having a front surface, a back, and outside edges, said cap having at least two openings through the outside edges thereof, each said opening capable of receiving the pin, each said pin having a length at least in excess of the thickness of the cap, each said pin being capped at the distal end to prevent the cap from moving from the pins;

the back surface of the cap being configured such that it conforms to the seating surface of the centered opening edges and seals said centered opening in the plug when seated therein;

the delivery notch being located in the top of said refractory tile, at the front thereof, the depth of said notch at the front of the refractory tile being deeper than the exit point of (ii) at the back of the refractory tile, the width of said notch at the front of the refractory tile being at least as wide as the flare of (ii) at the back of said refractory tile.

32. A waste to energy system comprising in combination at least:
a. a gasifier of claim 31;
b. an oxidizer;
c. an air to air, all-ceramic heat exchanger;
d. a gas turbine;
e. a generator operated from the gas turbine;
f. a filter and compressor driven by the gas turbine.

33. A waste to energy system as claimed in claim 32, wherein there is additionally used an auxiliary fuel supply system.

34. A waste to energy system as claimed in claim 32 wherein the auxiliary fuel supply system feeds into the gasifier.

35. A waste to energy system as claimed in claim 32 wherein the auxiliary fuel supply system feeds into the oxidizer.

36. A waste to energy system as claimed in claim 32 wherein the auxiliary fuel supply system feeds into both the gasifier and the oxidizer.

37. A waste to energy system as claimed in claim 32 wherein the auxiliary fuel is waste fuel.

38. A process of treating waste to create power, the process comprising feeding waste to the gasifier of a waste to energy system as claimed in claim 31, and recovering the power generated by the system.

39. A process as claimed in claim 38 in which steam is generated and recovered as power.

40. A process as claimed in claim 38 in which electrical power is generated and recovered.

41. A waste to energy system comprising in combination at least:
a. a gasifier of claim 31;
b. an oxidizer;
c. an air to air, all-ceramic heat exchanger;
d. a high pressure, medium temperature, alloy metal air-to air heat exchanger;
e. a gas turbine;
f. a generator operated from the gas turbine;
g. a filter and compressor driven by the gas turbine.

42. A waste to energy system as claimed in claim 41, wherein there is additionally used an auxiliary fuel supply system.

43. A waste to energy system as claimed in claim 41 wherein the auxiliary fuel supply system feeds into the gasifier.

44. A waste to energy system as claimed in claim 41 wherein the auxiliary fuel supply system feeds into the oxidizer.

45. A waste to energy system as claimed in claim 41 wherein the auxiliary fuel supply system feeds into both the gasifier and the oxidizer.

46. A waste to energy system as claimed in claim 41 wherein the auxiliary fuel is waste fuel.

47. A process of treating waste to create power, the process comprising feeding waste to the gasifier of a waste to energy system as claimed in claim 41, and recovering the power generated by the system.

48. A process as claimed in claim 47 in which steam is generated and recovered as power.

49. A process as claimed in claim 47 in which electrical power is generated and recovered.

50. A waste destruction system comprising in combination at least:
a. a gasifier of claim 31;
b. an oxidizer;
c. an air to air, all-ceramic heat exchanger;
d. a high pressure, medium temperature, alloy metal air-to air heat exchanger;
e. a gas turbine;
f. a generator operated from the gas turbine;
g. a filter and compressor driven by the gas turbine.

\* \* \* \* \*